United States Patent Office

3,313,861
Patented Apr. 11, 1967

3,313,861
PROCESS FOR THE SEQUENTIAL REACTION OF A COMPLEX AROMATIC CARBOXYLIC ACID, AN EPOXY MONOMER, AND A LINEAR POLY-AMIDE
Theodore H. Szawlowski, Wonder Lake, and Walter E. Kramer, Niles, Ill., assignors, by mesne assignments, to Union Oil Company of California, Los Angeles, Calif., a corporation of California
No Drawing. Filed Nov. 16, 1962, Ser. No. 238,287
3 Claims. (Cl. 260—830)

This invention relates to a novel class of epoxy resins and to their method of preparation. More particularly, this invention relates to new and improved epoxy resin formulations comprising (1) an epoxy resin or polyepoxy monomer, (2) a curing agent comprising polyamide resins of complex carboxylic acids derived from sulfur-containing aromatic compounds of petroleum orgin, and (3) also, a curing agent comprising said complex acids or extract polybasic acids (EPA) and polyamide resin used in the sequence named herein. More specifically, this invention relates to a novel class of epoxy resins prepared with a curing agent comprising polyamide resins or a combination of said complex acids (EPA) followed by polyamide resin of complex carboxylic acids derived from sulfur-containing aromatic compounds of petroleum origin, of the group consisting of solvent extracts obtained in the solvent refining of mineral lubricating oils with a solvent selective for aromatic compounds, hydrogenated solvent extracts, FCC recycle stock or decant oil from FCC processing and their mixtures by metalation, carbonation and acidification.

A feature of the invention is the discovery that the epoxy resins cured with the herein-defined polyamide resins of complex carboxylic acids or combination of EPA followed by polyamide resin, are dark, hard, tough and heat resistant products, exhibiting thermosetting properties making them useful as coatings, adhesives, castings, and electrical encapsulating compounds.

The amount of the polyamide of the complex carboxylic acid, which is used to control the properties as desired and is dependent upon the characteristics of the epoxy resin and any other components used, will vary between about 15% to 85% by weight and preferably is about 30% to 70% of the final blend. For most applications about 30% to 50% of the polyamide resin curing agent can be used.

Accordingly, it becomes a primary object of this invention to provide a novel and improved class of epoxy resins cured by reaction with or in the presence of a curing agent comprising polyamide resins of complex carboxylic acids or a combination of said complex acids (EPA) followed by polyamide resins derived from sulfur-containing aromatic compounds of petroleum origin or polyamide resins of said complex carboxylic acids.

Another object of this invention is to provide thermosetting epoxy resin compositions comprising an epoxy resin and a curing agent comprising complex carboxylic acids derived from sulfur-containing aromatic compounds of petroleum orgin and/or polyamide resins of said carboxylic acids.

Still another object of this invention is to provide a combination curing agent for epoxy resins comprising mixed polycarboxylic acids and polyamide resins of complex mixed carboxylic acids prepared by the reaction of solvent extracts, hydrogenated solvent extracts, FCC recycle stocks or decant oil from FCC processes with an alkali metal to form the alkali metal adduct, carbonation of the adduct to form the alkali metal salt of the corresponding carboxylic acid, acidification of said salt to form the free acid, and reaction of said acid with a polyamine.

An object of this invention is to provide a method of preparing new and useful epoxy resins using the new curing agents described herein.

These and other objects of this invention will be described or become apparent as the specification proceeds.

The instant invention emanated from a series of patent applications directed to the utilization of solvent extracts from the solvent refining of mineral lubricating oils and describing the source materials, the processes by which the acids are prepared, characterizations of the acids and also describing the preparation and properties of numerous derivatives of these unique and complex carboxylic acids. Some of the derivatives include haloacids, polyesters, polyamides, aminoamides and these applications describe various compositions containing these derivatives. The essential ingredients of the instant invention as described in said copending applications are set forth herein.

The polyamide resin curing agents of this invention are prepared from complex carboxylic acids derived from sulfur-containing aromatic hydrocarbons of petroleum origin such as (1) solvent extracts, obtained in the solvent refining of mineral lubricating oils using a solvent selective for aromatic compounds, (2) hydrogenated solvent extracts, (3) FCC recycle stocks, (4) decant oil from FCC processes, and (5) mixtures of any two or more of (1), (2), (3) and (4) by metalation, carbonation, acidification and transformation of the acid to a polyamide resin using the processes as described in copending applications Ser. Nos. 79,542 filed December 30, 1960 by W. E. Kramer, L. A. Joo and T. H. Szawlowski and 114,637 filed June 5, 1961 by W. L. Fierce and R. L. Weichman.

The polyamide resin curing agents of this invention are to be distinguished from the aminoamides of extract polycarboxylic acids (EPA) in that they are solids at room temperature and are long chains having 4 or more EPA units linked by polyamide units. Furthermore, the polyamide resin curing agents of this invention are distinguishable from the modified polyamide resins of the prior art, such as the reaction products of formaldehyde, a dimeric fatty acid containing two carboxyl groups per molecule and an organic amine, such as an aliphatic triamine. For instance, the complex carboxylic acid or mixture of mono-, di- and polycarboxylic acids derived from solvent extracts do not share the properties of dimer fatty acids, i.e., a polymerized fatty acid such as polymerized linoleic acid, described in U.S. Patent 2,956,968 or described in any of the references disclosed therein such as soybean fatty acids, linseed oil fatty acids, cottonseed oil fatty acids and the like.

Because of the complexity of the subject matter the complex carboxylic acids, their preparation and characterization will first be set forth, followed by a description of the polyamide resin derivatives thereof which are the novel curing agents of this invention.

THE COMPLEX CARBOXYLIC ACID

The complex carboxylic acids or acid mixtures used in accordance with this invention are prepared in accordance with the processes disclosed in copending application, Ser. No. 819,932, filed June 12, 1959, by T. W. Martinek (now abandoned and application Ser. No. 220,344, filed August 1, 1962 as a continuation thereof), Ser. No. 79,661 filed Dec. 30, 1960, by Messrs. W. E. Kramer, L. A. Joo and R. M. Haines (now U.S. Patent 3,153,087), and Ser. No. 160,882, filed Dec. 20, 1960, by T. W. Martinek.

These acids are further described in said related copending applications, Ser. No. 79,541 (now U. S. Patent 3,154,507) and Ser. No. 114,637 filed June 5, 1961, by W. L. Fierce and R. L. Weichman and also in application Ser. No. 79,506, filed Dec. 30, 1960, by Thomas W. Martinek (now U.S. Patent 3,116,257).

In accordance with said copending applications, the complex, polynuclear, aromatic, and alkaromatic carboxylic acids used to prepare the novel compositions of this invention are derived by metalation, carbonation, and acidification of a source of complex, polynuclear, aromatic sulfur-containing nuclei as represented by (1) solvent extracts obtained in the solvent refining of mineral lubricating oils using a solvent selective for aromatic compounds, (2) hydrogenated and refined solvent extracts, and (3) FCC recycle stock.

The resulting complex acids, hereinafter referred to as extract acids, or EPA, are mixtures of mono-, di- and polycarboxylic acids. Through chemical analysis, characterization and study of the physical and chemical properties, by way of illustration only, the extract acids can be represented by the following formulae:

Monobasic Acids

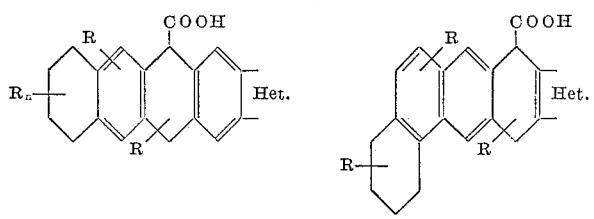

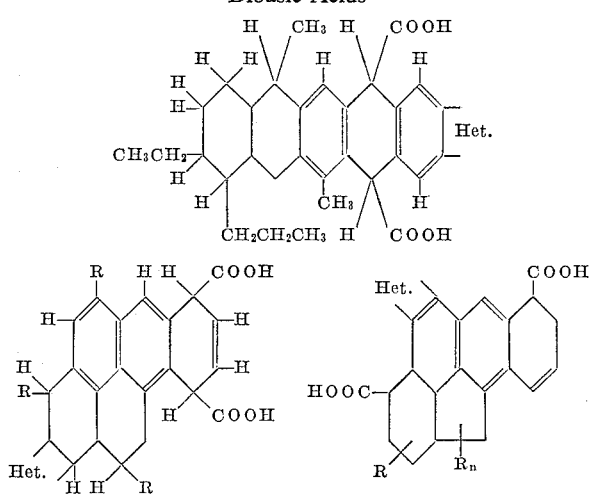

Dibasic Acids

Tribasic Acids

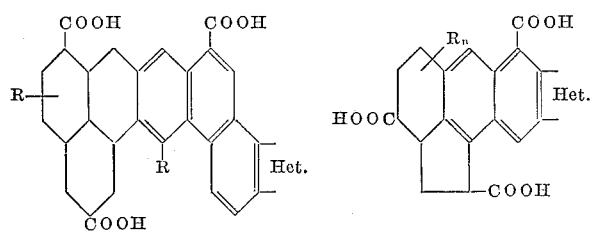

wherein "Het." illustrates one or more S-, or O-containing heterocyclic ring substituents, R is an alkyl or cyclo- alkyl radical having a total of 5 to 22 carbon atoms for each nucleus and $n$ has a value of 3 to 10. The molecular weight of the extract acids ranges from about 300 to 750, and the average molecular weight is about 350–475. Table I gives representative physical and chemical properties of the extract mono-, di- and polycarboxylic acids to be used in accordance with this invention.

TABLE 1

| Property: | Value |
|---|---|
| Av. mol. wt. range | 350–475 |
| Melting point, °C. | 60–100 |
| Bromine No. | 4–24 |
| Percent sulfur | 1.0–4.5 |
| Color | Deep red-dark brown |
| Percent unsaponifiables | 2–8 |

In the mixture of acids produced by metalation, carbonation, and acidification of solvent extracts, the monobasic acid derivatives constitute from 5–95% by weight, the dibasic acids constitute from 5–95% by weight and the polybasic acids, that is, those acids containing from 3 to as high as 7 carboxyl groups, make up from 0 to 20% by weight. In the preferred embodiment of the invention, the mixture of acids produced by metalation, carbonation, and acidification of solvent extracts from the manufacture of refined mineral lubricating oils may be used, although fractions of such acids, such as those prepared by the method of copending applications, Ser. No. 161,355 filed Dec. 22, 1961 by L. A. Joo and W. E. Kramer, Ser. No. 207,741 filed July 13, 1962, by L. A. Joo (now abandoned) and Ser. No. 207,780 filed July 13, 1962, by L. A. Joo (now U. S. Patent 3,180,876) may also be used.

Since the preferred source material, namely solvent extracts from the manufacture of mineral lubricating oil, does not lend itself to economical production of the desired complex acids using the prior art methods, the preferred methods of preparation set forth in said copending applications will be described and the properties of the acids set forth as examples. The details of these processes as described in said copending applications are incorporated herein by reference.

One procedure is to react about 30 parts of a petroleum fraction rich in complex polynuclear aromatics, as exemplified by solvent extract oils, with 1 to 5 parts of an alkali metal, such as sodium, potassium, cesium, lithium, and rubidium, and their mixtures and amalgams, at a temperature of about 60° to 80° C. in the presence of a reaction solvent such as dimethyl glycol ether, dimethyl ether, methylalkyl ethers, dialkyl glycol ethers, tetrahydrofuran, methylal, and trimethylamine. The formation of the adduct is promoted by shearing and agitation, providing an excess of alkali metal, using a pre-formed dispersion of the alkali metal in an inert solvent, or using a pre-formed dispersion of the alkali metal in a portion or all of the solvent extract. These techniques overcome the induction period of the reaction due to impurities, including sulfur compounds present therein, which tend to coat the alkali-metal particles and prevent the reaction or prolong the induction period. A Brookfield counter-rotating stirrer may be used to give continuous shearing and expose fresh metal surfaces during the reaction. Color changes indicate the progress of the reaction.

The alkali-metal adduct thus formed is either separated or left in the unreacted oil, and the mixture is treated with excess gaseous or solid carbon dioxide at temperatures ranging from about −20° C. to −80° C., causing a discharge of the color. This forms the alkali-metal salt of the complex acid which, upon acidification with a mineral acid, such as sulfuric, nitric or hydrochloric acids, yields the desired complex, polynuclear, carboxylic acids in good yields. To illustrate, the following non-limiting examples are given.

Example I

One hundred gms. of extract oil No. 19 (Table III) from the preparation of 170 vis., 100 VI neutral oil, dissolved in 675 cc. of dry tetrahydrofuran, was reacted with agitation at 10° to 30° C. with 8.3 gms. of metallic sodium in the form of 3/16" cubes. After 25 minutes, adduct-formation began and a strong color change took place. The product was cooled to −60° C. while an excess of carbon dioxide gas was introduced, resulting in a discharge of the color without precipitation. The 5.1 gms. of unreacted sodium was removed, the tetrahydrofuran was vacuum-stripped therefrom, and the remaining liquid combined with ether and water-washed. Acidification of the aqueous phase and further ether washing resulted in the recovery of the free acids. About 11% of the solvent extracted had reacted. The acid product (No. 1 of Table II) had an indicated average molecular weight of 686, a saponification value of 171, and a calculated equivalent weight of 328, indicating an average of 2.1 carboxyl groups per molecule.

Example II

One hundred gms. of extract oil No. 19 (Table III) and 675 ml. of dry tetrahydrofuran were charged to a one-liter, 3-necked flask equipped with a stirrer, thermometer, pressure-equalized drop-funnel, gas inlet with rotometer, and gas outlet. A dry nitrogen atmosphere was maintained in the flask. Approximately 100 gms. of Alundum balls, 5/16" in diameter, were charged and agitation started. The solution was cooled to −20° C. and 8.3 gms. of sodium as a 20% dispersion in toluene were added. After an induction period of about 5 minutes, the solution was warmed, and at −7° C. the reaction began; in 17 minutes it was proceeding rapidly. An excess of dry carbon dioxide was added at −80° C. over a period of 78 minutes. The reaction mass was worked up as in Example I after the excess sodium was destroyed with water. About 15% of the extract oil reacted, and 22.5 gms. of extract acid were recovered having a saponification value of 241, indicating an equivalent weight of 233. The acid product contained 2.8% sulfur.

Example III

The process of Example II was repeated producing complex acids having a saponification value of 323, an indicated equivalent weight of 173, an indicated average molecular weight (cryoscopic) of 350, and containing 3.0% sulfur. The ratio of molecular weight to equivalent weight was 3.5 indicating a mixture containing acids with more than two carboxyl groups per molecule on the average. (Acid No. 3 of Table II)

Example IV

The various recovered acids of application Ser. No. 819,932, illustrated in Table II therein, are further examples of mono-, di- and polycarboxylic acids to be used to prepare the polyamides of this invention.

Example V

The various carboxylic acid products described in Runs 12 through 47 of application Ser. No. 79,661 are further examples of acids that may be used.

In order to further illustrate the complexity and types of modifying acids that can be used in accordance with this invention the following tabulation is given:

TABLE II.—TYPICAL PROPERTIES OF A NUMBER OF EXAMPLE COMPLEX ACIDS (EPA)

| No. | Sap. Value | Mol. Wt. | Percent S | Br. No. | Percent Unsap. | Eq. Wt. | Eqs./Mol | Acid No. |
|---|---|---|---|---|---|---|---|---|
| 1 | 171 | 686 |  |  |  | 328 |  |  |
| 3 | 323 | 600 | 3.0 |  |  | 173 |  |  |
| 4 | 287 | 750 | 1.85 |  |  | 195 | 3.8 |  |
| 7 | 272 | 940 | 2.07 |  |  | 206 | 4.6 |  |
| 24 |  |  | 1.9 | 20 | 4.4 |  |  | 304 |
| 31 |  |  | 3.2 | 22 | 6.4 |  |  | 242 |
| 38 |  | 390 |  |  | 9.5 |  |  | 163 |
| 39 |  | 375 |  |  | 7.4 |  |  | 200 |
| 40 |  | 375 |  |  | 8.7 |  |  | 211 |
| 46 |  | 390 |  |  | 4.2 |  |  | 197 |
| 49 |  | 365 |  |  | 5.4 |  |  | 218 |
| 51 |  | 455 |  |  | 5.5 |  |  | 186 |
| 53 [1] |  | 385 |  |  | 2.5 |  |  | 255 |
| 54 |  | 380 |  |  | 6.4 |  |  | 216 |
| 60 |  | 375 |  |  | 3.2 |  |  | 196 |
| 63 |  | 345 |  |  | 4.0 |  |  | 202 |
| 71 |  |  |  |  | 4.2 |  |  | 233 |
| 8 |  |  |  |  |  |  |  | 73 |
| 101 |  | 405 |  |  | 9.0 |  |  | 168 |
| 102 [2] |  | 320 |  |  |  |  |  | 240 |

[1] This EPA was used in the examples set forth herein.
[2] Prepared from decant oil: API 15.4°, RI 1.5425, this acid had about 1.5 carboxyl groups per molecule.

The starting material for the reaction to prepare the complex modifying acids may be any complex, polynuclear, and/or heterocyclic aromatic hydrocarbon from petroleum sources. A preferred and unique source of aromatic starting material comprises petroleum fractions as herein defined, not only because the mono-, di-, and polybasic acid products therefrom have unique properties, but also because the techniques outlined herein are particularly adapted to processing these more complex and resistant source materials. Illustrating the preferred and novel starting materials is the class known as solvent extracts from the manufacture of mineral lubricating oils, which solvent extracts are rich in complex, polynuclear, aryl, alkaryl, condensed ring and heterocyclic nuclei forming the organic portion of the mono-, di-, and polybasic carboxylic acids, or their mixtures, of this invention. Solvent extracts from the manufacture of bright stock and neutral lubrication oils are particular examples of such fractions rich in complex aromatic compounds obtained as by-products from the solvent refining of mineral oils.

For example, a preferred source of the above-defined complex hydrocarbons comprises the solvent extracts obtained in solvent refining mineral oils, particularly lubricating oil fractions using a solvent selective for aromatic compounds. These extracts, hereinafter referred to as solvent extracts, are obtained as the extract or solvent phase when lubricating oils are refined by treatment with said selective solvent having an affinity for the aromatic compounds. The solvent extracts illustrated herein are also examples of the oleaginous vehicle which can be all or part of the compositions of this invention.

Since the general process of refining mineral lubricating oils in which solvent extracts are obtained is well known, and is related in detail in said copending applications, it is only necessary for present purposes to give some examples by way of illustration. Following are the physical characteristics of typical extract products, from lubricating oil stocks derived from various crude oils and other source hydrocarbon materials, which may be used to prepare the aminoamides of this invention and for modifying epoxy resins as prepared herein.

TABLE III.—SOURCES AND PHYSICAL CHARACTERISTICS OF SOLVENT EXTRACTS

| Ext. No. | Crude Source | Solvent | API Grav. | Sp. gr. at 10° F. | Vis./ 100° F. | Vis./ 130° F. | Vis./ 210° F. | V.I. | Pour | ° F. Flash | ° F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.60 |
| 2 | ---do--- | ---do--- | 15.4 | | 15,000 | | 285 | +39 | — | | | | | |
| 3 | ---do--- | ---do--- | 12.6 | | 36,410 | 4,310 | 310.1 | −1 | +80 | | | | 4.7 | 2.27 |
| 4 | ---do--- | ---do--- | 14.6 | | 19,500 | 4,305 | 313 | +27 | +90 | | | | 4.7 | 2.2 |
| 5 | ---do--- | ---do--- | 15.4 | | 32,500 | | 372 | +5 | +60 | | | | 4.13 | 2.33 |
| 6 | ---do--- | ---do--- | 13.7 | | 25,000 | 5,400 | 355 | +27 | +80 | | | | | 2.18 |
| 7 | ---do--- | ---do--- | 8.6 | | 145,000 | 19,000 | 616 | 0 | +70 | | | | | |
| 8 | ---do--- | ---do--- | 10.5 | | 12,676 | 2,514 | 172.1 | −101 | +60 | | | | | 2.18 |
| 9 | Santa Fe Springs. | ---do--- | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.4 | | |
| 11 | Penn | Chlorex | 12.2 | 0.9843 | | | 1,365 | | +85 | 560 | 630 | 71.4 | | |
| 12 | ---do--- | Nitrobenzene. | 10.0 | 1.000 | | | 1,500 | | +75 | 555 | 640 | 60 | | |
| 13 | Mid-Cont | Propane cresol. | 14.4 | 0.9699 | | | 1,500 | | +100 | 540 | 605 | 63.7 | | |
| 14 | ---do--- | Phenol | 13.6 | | | | 41.7 | −82 | +20 | | | | | |
| 15 | ---do--- | Chlorex | 13.6 | | | | 200 | −61 | +75 | | | | | |
| 16 | ---do--- | Phenol | 8.9 | | | | 569 | | +75 | | | | | |
| 17 | ---do--- | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | ---do--- | ---do--- | 11.1 | | | | 61.5 | −56 | +40 | 435 | 475 | | 0.42 | 2.7 |
| 20 | ---do--- | ---do--- | 13.7 | | | | 360 | +25 | +65 | 550 | 630 | | 5.5 | 2.3 |
| 21 | ---do--- | ---do--- | 7.7 | | | | 71.1 | −128 | +35 | 420 | 495 | | 0.86 | 3.2 |
| 22 | ---do--- | ---do--- | 7.3 | | | | 796 | −76 | +65 | 520 | 610 | | 7.7 | 3.0 |
| 41 | ---do--- | ---do--- | 17.6 | | 154 | 80 | 41 | 11 | +30 | 400 | 435 | | 0.1 | 2.0 |
| 42 | ---do--- | ---do--- | 13.7 | | 26,000 | 5,615 | 360 | +25 | +65 | 550 | 630 | 37.5 | 5.5 | 2.3 |
| 43 | ---do--- | ---do--- | 11.1 | | 1,054 | 331 | 61.5 | −56 | +40 | 435 | 475 | 40.0 | 0.4 | 2.7 |
| 44 | ---do--- | ---do--- | 7.7 | | 2,007 | 611 | 71.1 | −128 | +35 | 420 | 495 | 38.6 | 0.86 | 3.2 |
| 45 | ---do--- | ---do--- | 7.3 | 1.019 | 230,000 | 20,800 | 796 | −76 | +65 | 520 | 610 | | 7.7 | 3.0 |

Extract No. 41 was obtained in the production of 85 Vis neutral, has an average molecular weight of 300, and contained 76.8% aromatics (by the silica gel procedure).

Extract No. 42 was obtained in the production of 150 Vis Bright Stock, has an average molecular weight of 590, contained 86% aromatics, 14% saturates, analyzed 86.2% carbon, 11.4% hydrogen and averaged 3.3 aromatic rings per aromatic molecule.

Extract No. 43 was obtained in the production of 170 Vis neutral, has an average molecular weight of 340, contained 84.1% aromatics, 15.9% saturates, analyzed 86.4% carbon, 10.7% hydrogen, and averaged 2.7 aromatic rings per aromatic molecule.

Extract No. 44 was obtained in the production of 200 Vis neutral, has an average molecular weight of 340 and contained 87% aromatics and 13% saturates.

Extract No. 45 was obtained in the production of 160 Vis Bright Stock and contained 92% aromatics and 8% saturates.

The solvent extracts from lubricating oils used as starting materials for this invention have the following general properties and characteristics:

TABLE IV

| Characteristic: | Range of Value |
|---|---|
| Gravity, ° A.P.I. | 7.3–18.3 |
| Gravity, Sp., 60/60° F. | 0.945–1.022 |
| Viscosity SUS @ 210° F. | 40–1500 |
| Viscosity index | −128–+39 |
| Pour point (max.) ° F. | +35–+100 |
| Molecular weight, average (above 300) | 320–750 |
| Boiling point (initial) ° F. | 300–1000 |
| Boiling point (end) ° F. | 400–1200 |
| Sulfur, percent wt. (total) | 0.5–4.5 |
| Sulfur compounds percent by vol. | 20–50 |
| Aromatic compounds | 25–90 |
| Neutral aromatic hydrocarbons | 40–51 |
| Av. No. of aromatic rings/mean arom. mol. | 1.7–5.0 |

In characterizing the complex acids, and the polyamide resin curing agents of this invention, the molecular weights, sulfur content and average number of aromatic rings per mean aromatic molecule as shown above are the selected criterion.

The complexity of the types of compounds present, as based on these analyses, is illustrated by the following table:

TABLE V.—ESTIMATED CHEMICAL COMPOSITION OF SOLVENT EXTRACTS NOS. 19, 21, 43 AND 44 OF TABLE III

| Type of Compound: | Approx. percent in the extract |
|---|---|
| Saturated hydrocarbons | 12.5 |
| Mononuclear aromatics: | |
| Substituted benzenes | 25.0 |
| Dinuclear aromatics: | |
| Substituted naphthalenes | 30.0 |
| Trinuclear aromatics: | |
| Substituted phenanthrenes | 10.0 |
| Substituted anthracenes | 5.0 |
| Tetranuclear aromatics: | |
| Substituted chrysenes | 0.5 |
| Substituted benzphenanthrenes | 0.2 |
| Substituted pyrenes | 0.2 |
| Pentanuclear aromatics: | |
| Perylene | 0.01 |
| Sulfur compounds,[1] oxygen compounds, etc. | 16.5 |

[1] Mainly heterocyclic compounds. The average mol. wt. of Extracts 19 and 21 is 340, and that of Extract 20 is 590.

Any portion of the reactive aromatic constituents in solvent extracts may be isolated therefrom, or from other sources, to be used as starting materials for the reaction in accordance with this invention. For example, solvent extracts may be distilled and selected fractions thereof used as the starting materials. The content of reactive, complex, polynuclear, aromatic compounds and heterocyclics present in solvent extracts, as illustrating the preferred source material, may vary depending on the type of solvent, the extraction process applied, and the mineral oil treated, although the general types of compounds present in the extract are not so varied. Extracts containing from about 30% to 90% of polynuclear aromatics and heterocyclics of aromatic nature represent a preferred type of starting material for economic reasons.

The solvent extract starting material may be vacuum-distilled, dewaxed and/or clay-contacted and/or hydrogenated, prior to use in preparing the complex carboxylic acids from which the selected fractions used in accordance with this invention are derived. Dewaxing can be accomplished by known methods, e.g., treatment with 45%

MEK and 55% toluene as the dewaxing solvent, using temperatures in the order of −10° F., and solvent/solvent extract ratios of about 8/1. This treatment results in a dewaxed extract which has a pour point of about +5° F. and results in the removal of about 2% wax having a melting point of about 130° F. Clay-contacting can be accomplished by known methods.

The preparation of hydrogenated extracts is accomplished using known methods of hydrogenation, particularly mild hydrogenation; thus a preferred method of preparing hydrogenated extracts is to hydrogenate the distillate lube oil or residual oil before the extraction by treatment with hydrogen at 100–50 p.s.i.g. using temperatures of 530–600° F. in the presence of a molybdena-silica-alumina catalyst. This same method can be applied to the solvent extracts per se, that is after the separation from the raffinate.

Hydrogenation has been found to result in the decarboxylation of any naphthenic acids present and the production of an extract from which complex acids of enhanced properties can be obtained by metalation, carbonation, acidification and fractionation.

Other known methods of hydrogenation can be applied to the solvent extracts using such catalysts as Filtrol, cobalt-molybdate, silver-molybdate and Porocel. The characteristics of a representative hydrogenated dewaxed and clay-contacted solvent extract are ° API, 9.5; color, NPA, 7; Flash (COC), 420° F.; Fire (COC), 465° F.; Pour Point, −5° F.; Vis @ 100° F., 1075 SUS; Vis @ 210° F., 58.5 SUS; VI, −96; Neut. No. (1948), 0.05; Sulfur, 2.60 wt. percent and CR percent, 0.01. The FCC recycle stock is illustrated by the 19% extract (phenol solvent) of FCC recycle stock, which extract had the following properties: ° API, 1.8; sulfur, 1.9 wt. percent; Br. No., 17; RI (20° C.) 1.6372 and Engler Distillation, −IBP=589° F.; 90%−745° F. The use of these latter starting materials is described in copending application Ser. No. 79,661.

Without limiting the invention, the characteristics of the products of this invention as influenced by the complex acids are further disclosed as thus far evaluated. The mono-, di- and polycarboxylic acids used are mixtures of acids of the dihydronaphthalene, dihydrophenanthrene, and dihydroanthracene types, having several alkyl groups and/or cycloalkyl groups on each aromatic nucleus wherein the sum of the carbon atoms in the alkyl substituents varies between 5 to 22. Despite the size of the acid molecules, the linkages through or between the carboxyl groups are about the same as those of phthalic and terephthalic acids. A portion of the aromatic rings or condensed aromatic rings are probably further condensed with naphthenic rings to form configurations similar to the steroid ring systems. Extract acids from solvent extracts obtained in the production of bright stocks probably contain more highly condensed aromatic structures. Most of the sulfur is in the form of heterocyclic rings with carbon, associated with both the aromatic-type and naphthenic-type structures present. Only trace amounts of the sulfur are present as high-molecular-weight aliphatic sulfides. The nitrogen content of distilled solvent extracts is 0.01 to 0.04%. Analysis for the types of carbon linkages as percent $C_a$ (carbon atoms in aromatic configuration) percent $C_n$ (carbon atoms in naphthenic configuration) and percent $C_p$ (carbon atoms in paraffinic configuration) gives results ranging from about 30–40% $C_a$, 20–35% $C_n$, and 31–47% $C_p$ using the method of Kurtz, King, Stout, Partikian and Skrabek (Anal. Chem., 28, 1928 (1956)). They are soluble in ethyl ether, acetone, methyl ethyl ketone, tetrahydrofuran, benzene, toluene and xylene.

The preparation of hydrogenated solvent extracts, the properties of the hydrogenated products, the preparation of FCC recycle stock, the properties thereof and also the decant oil are all described in detail in several copending applications including application Ser. No. 242,- 076 filed December 4, 1962 by Messrs. W. E. Kramer, L. A. Joo and T. H. Szawlowski. Since these materials are so well known it is only necessary to describe illustrative examples. A typical FCC recycle oil has an IBP of about 150° F., EP 485° F. 10 mm. Hg, Vis Cg at 100° F. of 6.16, RI at 67° C. of 1.4958. Pour point +50° F. contains 0.59% by weight of sulfur, 0.02 wt. percent of nitrogen, CR 0.14, Br. No. 2.8 and an analine point of about 155° F. A typical 19% extract thereof contains 1.9 wt. percent of sulfur, has a Bromine No. of 17, RI of 1.6372 and Engler Distillation: IBP of 589° F., 90% @ 745° F. A typical FCC decant oil has the following characteristics: API gravity 15.4°, IBP 375° F., EP 995° F., CS vis. @ 100° F. 21.0 RC of 1.70, mol. wt. of 320. These are described in more detail in application Ser. No. 242,076.

THE POLYAMIDE RESIN CURING AGENTS

By reacting the complex carboxylic acids, as just described, with a polyamine containing at least two primary amine groups, under amide formation conditions, in accordance with application Ser. No. 79,548 filed December 30, 1960 by T. W. Martinek (now U.S. Patent 3,154,-524), polyamides represented by the formula

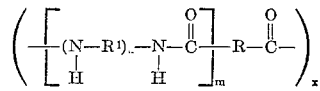

are formed wherein $R^1$ embodies a divalent hydrocarbon radical with a chain length of at least 2 carbon atoms, i.e., $R^1$ may be alkyl, aryl, cycloparaffinic, alkaryl or aralkyl in nature and contain up to 30 carbon atoms, R is the complex polynuclear, aromatic, alkylaromatic and/or heterocyclic (that is, containing some heterocyclic rings of carbon, sulfur, and/or nitrogen and oxygen) nuclei derived from solvent extracts obtained in the solvent refining of mineral lubrication oils, and $x$ has a value of about 4 to 1000, $m=1$ to 6, $n=1$ to 10. The foregoing formula represents a repeating unit in the complex polyamide chain.

Polymers of differing molecular weight and physical properties may be attained by varying the relative concentrations of reactants, time-temperature cycles, etc., as is well known in this art.

The amines used to prepare the curing agents above-defined used in accordance with this invention have the formulae:

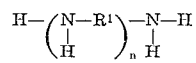

or

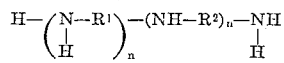

where $n=1$–10 and wherein $R^1$ embodies a divalent hydrocarbon radical with chain length of 2–30 carbon atoms, i.e., $R^1$ may be alkyl, aryl, cycloparaffinic, alkaryl, aralkyl or heterocyclic (i.e., contain oxygen, nitrogen or sulfur in the chain or rings), in nature. When $R^1$ contains nitrogen, the nitrogen may be present as either secondary or tertiary amine groups. The amines employed in this case may be diamines; $R^1$ is the radical $(CH_2)_x$ where $x$ is at least 2. Typical polymethylene diamines include ethylenediamine, trimethylenediamine, tetramethylenediamine, pentamethylenediamine, heptamethylenediamine, octamethylenediamine, nonamethylenediamine, decamethylenediamine, etc. The di-primary amines such as 1,3-propylene-diamine, 1,4-butylene-diamine, 1,5-pentylene-diamine, 1,6-hexylene-diamine, 1,7-heptylene-diamine, 1,20-eicosylene-diamine, 1,5-octane-diamine, 1,6-octane-diamine, 1,4-hexane-diamine, 1,3-heptane-diamine, 2,2 - dimethyl-1,3-propane-diamine, orthophenylenediamine, metaphenylenediamine, paraphenylenediamine, m-xylylenediamine, 3,3' - diaminobiphenyl, 4,4'-diaminophenylmethane, p,p'-bisaminomethyl diphenylmethane, 4,4'-methylene-bis-aniline and the like are included.

Other examples include 1,3,5-pentylene-triamine, 1,2,4-hexylene - triamine, 1,5,8 - octylene-triamine, o-aminobenzylamine, m-aminobenzylamine, p-aminobenzylamine, symtriaminotoluene, 1-phenylethane diamine, the hydroxy aromatic diamines and the like polyfunctional amines which are well known in the art.

Diamines prepared by reacting ethylenimine with a long chain primary aliphatic amine at temperatures of from 150° to 225° C. may be used. Amines containing an alicyclic nucleus can be used as represented by trans-1,2-diaminocyclobutane, 1,3-diaminocyclohexane, 1,4-diaminocyclohexane. Diamines containing ether groups can be used as represented by 1,7-diamino-4-oxaheptane and higher homologs, i.e., 1,10-diamino-4,7-dioxadecane, 1,12-diamino-5,8-dioxadodecane, 1,11-diamino-4,8-dioxaundecane, 1,13-diamino-5,9-dioxatridecane. Polyamines such as diethylenetriamine (DETA), triethylenetetramine (TETA), dipropylenetetramine, tetrapropylenepentamine, propylenediamine, dibutylenetriamine, tributylenetetramine, tetraethylenepentamine (TEPA), may be used.

The preparation of the polyamide curing agents of this invention can be accomplished by any of the processes well known in the art, several of which are illustrated in the examples to follow. All of these processes involve the condensation of the complex extract acids and a polyfunctional amine. Many such amines and processes for their condensation with dicarboxylic acids are described in the prior art as illustrated by Carother's U.S. Patents 2,130,523 and 2,130,948.

It is obvious that the bifunctional or polyfunctional amines used as reactants may be replaced by various equivalent bi- and poly-functional amine compounds in any manner known in the art. Moreover, the process of preparing the polyamide curing agents of this invention, whether they be linear, or cross-linked polymers, resides basically in heating the two bifunctional or polyfunctional reactants until the product has polymerized to the resinous stage, which stage is not generally reached until the polyamide has an intrinsic viscosity of at least 0.1 and preferably about 0.4 to 0.6. Although various methods of accomplishing this condensation reaction are available, the most practical and useful method involves heating of the reactants with or without solvent using techniques well known in the art, including multistage processing.

Further, although the invention will be illustrated using simple diamines or polyamines, it is to be understood that mixtures of various diamines, polyamines and mixed diamines and polyamines, and mixtures of said complex carboxylic acids or selected fractions of the acids, may be used without departing from the invention and that the order of addition may be varied. The use of a mixture of amines and/or varied order of addition for the reaction has utility in controlling, varying and augmenting the resinous properties of the polyamide product. For example, a small amount of a polyamine may be used to promote cross-linking of the diamine-polybasic extract acid amide product.

In order to illustrate the preparation of one form of polyamide resin curing agents of the present invention, the following examples are given:

*Example VI*

Three hundred g. of polybasic, polynuclear acids prepared in accordance with Example I, having an acid value (AOCS) of 172 and a saponification value of 189, and 35 g. of ethylene diamine are charged to a one-liter, three-necked flask equipped with a stirrer, thermometer, and water-trap reflux condenser. The mixture is heated under a nitrogen atmosphere, with stirring, to 240° F., the water of reaction being removed by means of the water trap in the reflux condenser. After about three hours, the reflux rate decreases and the pot temperature starts to rise. When the pot temperature reaches about 400° F., reflux practically ceases, evidencing substantial completion of reaction. The remaining traces of moisture and excess amine are removed by applying vacuum, and the hot, viscous, liquid resin is poured into a container or mold where it solidifies upon cooling. The solid resin is thermoplastic, somewhat brittle, and soluble in aromatic hydrocarbons. The polyamide resin product is suitable for use as a curing agent in accordance with this invention.

*Example VII*

The polybasic, polynuclear acids of Example I in an amount to provide a 0.1 molar excess are reacted with p-phenylene diamine as in Example VI. The resulting resin is heated to about 600° F. at which temperature it begins to set within about 30 minutes. The partially thermoset resin is only slightly soluble in aromatic hydrocarbons, and is suitable for use in the manufacture of glass-fiber reinforced plastics. Further heating results in greater cross-linking and produces a hard polyamide resin which, when pulverized, can be suitably used as a curing agent in epoxy formulations.

*Example VIII*

Three hundred gms. of the polybasic, polynuclear acids have an A.N. of 240, Br. No. of 25, and percent S of 2.6%, were treated with 48 gms. trimethylene diamine in the presence of 100 g. xylene. The reaction was essentially complete at 450° F. pot temperature as evidenced by cessation of water removal. The resultant resin was a hard, slightly elastic material with a tensile strength of 96 #/in.

*Example IX*

The reaction of Example VIII is repeated using 40 gms. of p,p'-bisaminomethyldiphenylamine. The resulting resin is slightly soluble in aromatic hydrocarbon solvents and is a highly suitable amine-tetraminated solid polyamide which may be pulverized for use as a curing agent with epoxy resins.

*Example X*

Three hundred g. of solvent extract dibasic acids of Example VIII were treated with 68 g. of diethylene triamine in 100 g. xylene. At 450° F. the reaction was essentially complete. The resultant dark amber resin had a tensile strength of 216 p.s.i. It can be used in the granulated or powdered form as a curing agent for epoxy resins.

*Example XI*

310 gms. of the resin of Example X is further reacted with 150 gms. of the dibasic acids of Example VIII by heating to 600° F. for about one hour. The product is a non-melting cross-linked polymer eminently suitable for use in the pulverized form as a curing agent for epoxy resins.

*Example XII*

300 gms. of dibasic acids obtained by the sodium metalation of extract, obtained by the phenol extraction of neutral lubricating oil, and subsequently carbonated and acidified and having the following properties: acid number—240, bromine number—25, percent sulfur—2.57, were mixed with 100 gms. of xylene and heated in a kettle to 90° C. with agitation. As soon as all the acid had dissolved in the xylene, 96 gms. of triethylenetetramine were slowly added dropwise, care being taken to maintain the rate of addition to prevent uncontrollable exothermic reaction. After the triethylenetetramine had been added, the temperature of the reaction mixture was raised to 218° C. The evolved water-xylene mixture was condensed by means of a water-cooled condenser and removed. When the evolution of water and xylene had ceased, heating was stopped and the reaction mixture was allowed to cool to room temperature. This first stage reaction mixture (the linear polyamide polymer) was hard and brittle and was easily pulverized by rubbing, and had properties suitable for curing epoxy resins.

*Example XIII*

300 gms. of polybasic polynuclear acids having an acid number of 241, prepared from solvent extract No. 41, are reacted with a sufficient amount of tetraethylene pentamine to provide 0.5 equivalent of said acid for every primary and secondary amine group, at 500° F. for 4 hours producing a cross-linked hard resin which, when pulverized finely, can be used as an epoxy curing agent.

As seen from the description, the invention is directed to polyamide curing agents prepared by the reaction of polyfunctional amines with polybasic polynuclear aromatic acids derived from petroleum fractions rich in polynuclear aromatic nuclei. Linear polymeric curing agents are formed with difunctional amines and cross-linked polymeric curing agents are formed with polyfunctional amines. At temperatures of about 450° to 700° F., polyamides having valuable properties are obtained by reacting polyfunctional amines with 0.5 to 0.9 equivalent per amino group of the polybasic polynuclear aromatic acids derived from petroleum fractions. Cross linked or cross linkable thermosetting polyamides prepared by the reaction of petroleum base polynuclear polyaromatic polybasic acids with polyfunctional amines, particularly these containing three or more reactable amino groups wherein a 10% to 30% molar excess of acid functions is employed, particularly at temperatures of 450° to 700° F. are also contemplated. In the latter instance, reaction occurs between the excess unreacted acid functions and the active hydrogen atoms on the amido groups.

The following examples, taken from copending application Ser. No. 79,542, are also illustrative of curing agents to be used in accordance with this invention.

*Example XIV*

150 gms. of the solvent extract acids used in Example XII were mixed with 60 gms. of xylene in a kettle and the mixture was heated to 90° C., with agitation, until all the acid had become dissolved in the xylene. 52 gms. of triethylenetetramine were then slowly added dropwise, after which the mixture was heated to and maintained at 218° C. while water and xylene were withdrawn through the condenser. When the rate of water evolution had diminished significantly, the heat was turned off and the mixture allowed to cool to 121° C. This product is a suitable curing agent.

*Example XV*

The procedure in Example XIV was repeated using 150 gms. of the solvent extract acids as prepared in Example I, 60 gms. of xylene and 67 gms. of tetraethylenepentamine.

The reactions of Examples XIV and XV are carried out by reacting a polyamine having at least three aminogroups of the group consisting of two primary and one secondary amino groups, with a polycarboxylic acid derived from sulfur-containing aromatic compounds as herein described, under conditions which promote reaction between the acid and a portion only of the amino groups, thereby forming a linear polyamide polymer to act as a curing agent.

Where the amine contains both primary and secondary amino groups, the primary amino groups react preferentially. The degree of polymerization is controlled by the reaction temperature and the ratio of reactants. For maximum chain length stoichiometric proportions of primary amine and acids should be used. However, a slight excess (1–10% equivalent) of amine should always be used. Both the "solvent cook" and "fusion cook" methods are applied.

In the "solvent cook" procedure, the polyamine and complex carboxylic acid are reacted in the presence of a small quantity of a suitable solvent such as xylene or toluene at temperatures of between about 100 and 150° C., and the resulting azeotrope is driven off. The xylene-water azeotrope forms at 92° C. and the toluene-water azeotrope forms at 84° C., thus giving relatively low reaction temperatures. Other solvents that are useful are octane, dibutylether, mesitylene, decane and diamylether.

In the "fusion cook" process the polyamine and the polycarboxylic acid are merely mixed together in a reaction vessel and heated to cause reaction and drive off the water of reaction. The procedure requires the mass to be heated to a higher temperature than is required in the "solvent cook" procedure and, as a result, there is a tendency to increase reactivity between the secondary amine groups and the carboxyl groups. For this reason the "solvent cook" procedure is preferred. Suitable temperatures for the "fusion cook" are between about 100 and 250° C. The reaction is continued by either method until the evolution of water slows down perceptibly or ceases and the resulting reaction mixture is ready for curing epoxy resins.

In order to demonstrate the use of polyamide resins or the combination of EPA and polyamides as curing agents, the following examples are given.

*Example XVI*

A 50 g. portion of powdered extract polybasic acid polyamide resin was charged to a blending kettle along with 45 g. of Epon 820 (A Bisphenol A-epichlorohydrin condensate) and 5 g. of epichlorohydrin (added as a solubilizer and as a reactive diluent which prevents undesirably high viscosity of the reaction mixture). The reaction mixture was heated just sufficiently to permit thorough blending and cast. The black resin that formed was very hard and tough.

*Example XVII*

A 30 g. portion of granulated extract polybasic acid and 20 g. of epichlorohydrin and 1 g. of pyridine were blended in a blending vessel while gradually heating up to 180°–190° F. for 20 minutes. Then heated for 10 minutes (with stirring) up to 220° F. to form a black, viscous polymer. Then 50 g. of this black, viscous polymer product was blended warm (at 110°–130° F.) with 50 g. of polyamide resin at same temperature and the blended mixture was cast into molds and cured in oven at 150° F. for 5 hours. The resulting product was a hard, black resin.

*Example XVIII*

A 50 g. portion of powered extract polybasic acid, 30 g. of Epon 812, 20 g. of epichlorohydrin and 1.5 g. of pyridine were charged to a blending kettle and gradually heated up to 180°–190° F. for 15–20 minutes. After this, mixture was brought up to 220° F. for 5 minutes with vigorous stirring to form a very thick, black polymer fluid. Then 100 g. of this thick, black polymer was warmed to 130–140° F. and blended warm with 100 g. of polyamide resin at same temperature. This blended mixture was rapidly poured into molds and oven cured at 170° F. for 8 hours. The resulting product was a hard, black resin with unusual toughness.

Table VI gives further illustrative examples.

TABLE VI.—CURED RESIN PRODUCTS

| Cured Resin Product Number | Polyamide | Epoxy Monomer | Diluent | Comments |
|---|---|---|---|---|
| 1 | Ex. VIII | Epon 826 | Diglycidyl ether | Laminating. |
| 2 | Ex. VII | Epon 830 | do | |
| 3 | Ex. VI | Epon 836 | do | |
| 4 | Ex. XIII | Epon 1007 | Epichlorohydrin | Casting forms. |
| 5 | Ex. XII | Epon 1009 | do | Do. |
| 6 | Ex. XIV | Epon 812 | None | } Laminating and adhesive surfaces. |
| 7 | Ex. XV | Epon 820 | do | |

THE EPOXY RESINS

The epoxy resins or resin intermediates to be treated in accordance with this invention are well-known and are widely used as adhesives, encapsulating compounds, laminates structural forms and the like. The intermediates, or epoxy monomers, are cured, in accordance with this invention by using the aminoamides of the complex carboxylic acids just described, in place of all or part of the known curing agents, such as polyamines, dibasic acids, polyamides and the like. Epoxy resins are expensive and are generally extended with other resins such as phenol-formaldehyde resins, aniline-formaldehyde resins, polyester resins, polyvinyl resins, urea-formaldehyde resins, melamine-formaldehyde resins, and the like. These resin extenders as well as the aminoamides of this invention, depending on their properties and the conditions of the reaction, may or may not cross-link with the polyepoxy resin and cause significant changes in the properties.

The polyepoxy-resin intermediate used in preparing the extended resins of this invention can be any of the broad class of polyepoxides known to be useful in preparing cured resins. In general, these polyepoxides are straight-chain polymers prepared from low-molecular-weight diepoxides and contain an epoxide group at each end of the chain. The epoxy resins contemplated by this invention include the newest class of these materials as prepared from monomers having two or more reactive epoxide groups in the monomer structure.

The epoxy monomers are available commercially, both in liquid and solid forms (the term "monomer" as used herein includes compositions which are strictly monomeric or which are partially polymerized or contain small amounts of polymers), and are polymerized by addition of curing agents which include primary, secondary, and tertiary amines, and poly-functional compounds such as glycols, polyglycols, polyamines, polyamides, and carboxylic acid anhydrides. The resins which are prepared by curing epoxy-resin monomers are cross-linked resins of the thermosetting type, and are characterized by high chemical and thermal stability at high tensile and impact strength. The resins are prepared by addition to the epoxy monomer of a small amount of a curing agent. The curing agent is added to the epoxy resin in an amount which is effective for the particular resin to promote the hardening of the resin. The selection of the particular curing agent is determined by the characteristics of the epoxy resin composition and the proportion of the curing agent may vary widely, although the use of about .5–20% wt. of the curing agent is preferred.

Preferably, the polyepoxide used as the starting material is aromatic in chemical character.

Thermosetting synthetic resins formed by the polymerization of an ethylene oxide derivative containing at least two ethylene-oxide groups in the molecule, in the presence of inorganic or organic bases (as described in U.S. Patent 2,444,333), can be used in accordance with this invention. These resinous condensation products are prepared by the reaction between epihalohydrin, for instance epichlorohydrin,

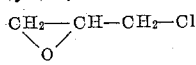

and bis-(4-hydroxyphenyl)dimethylmethane, commonly known as "Bis-phenol A," prepared by the condensation of 2 mols of phenol with 1 mol of acetone and having the formula,

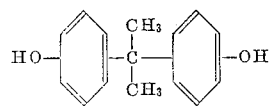

with or without an organic compound present corresponding to the general formula ZCNRNCZ, where R is a divalent organic radical free of functional groups other than the two NCZ groups and Z is a member selected from the class consisting of oxygen and sulfur.

The diphenol product is then reacted with epichlorohydrin in the presence of caustic to yield the diglycidyl ether in accordance with the equation:

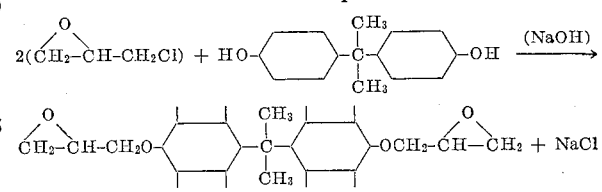

However, when the stoichiometric 2:1 ratio is employed, the yield of the monomeric diglycidyl ether is less than 10%, with the remaining material being higher-molecular-weight condensation and polymerization products. In order to obtain high yields of the monomeric product, excess epichlorohydrin is employed, the stoichiometric amount being doubled or tripled. It is then possible to obtain yields of 70% or more of the monomer. The epoxy "monomers" which are available commercially are generally mixtures containing varying amounts of the true monomer and other higher-molecular-weight condensation and polymerization products. The number of potentially useful reactants for the synthesis of epoxy resins is quite large. All varieties of polyhydric phenols, polyalcohols, polyfunctional halohydrins, and polyepoxides, have been suggested as intermediates in the literature. Many of these epoxy monomers which can be used in the preparation of epoxy resins are described in such text books as "Epoxy Resins," Skeist, Reinhold Publishing Corp., 1958, and "Epoxy Resins," Lee and Neville, McGraw-Hill Book Company, 1957. Compounds which are useful intermediates in the preparation of epoxy resins include diepoxides, such as butadiene diepoxide and divinylbenzene diepoxide, and diglycidyl ether,

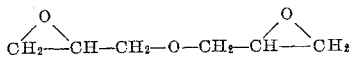

Other diglycidyl ethers include those produced by reaction of epichlorohydrin with other polyhydroxy compounds such as resorcinol, hydroquinone, pyrocatechol, saligenin, phloroglucinol, bisphenol A, trihydroxydiphenoldimethylmethane, fluor - 4 - dihydroxybiphenol, long-chain bisphenols, 4,4'-dihydroxydiphenol sulfone, novolac resins, ethylene glycol, and higher glycols, glycerol, erythritol, pentaerythritol, etc., in the presence of alkali. Glycidyl esters are also known to be useful intermediates (resin monomers) in the preparation of epoxy resins. Such esters include the diglycidyl ester of diphenolic acid, diglycidyl esters of phthalic acids (all three isomers), and diglycidyl esters of aliphatic dibasic acids, e.g., succinic acid, suberic acid, pimelic acid, etc. In the copending application of Walter E. Kramer and Louis A. Joo, Ser. No. 58,638, filed September 27, 1960, the diepoxy esters of 4,4-tetrahydrodipyridyl dicarbamic acid (and analogs thereof), are disclosed as being novel epoxy resin monomers.

The resinous condensation products thus formed, which are prepared by one method in accordance with U.S. Patent 2,444,333 infra, are known as "Epon" resins which range from solids to viscous liquids having molecular weights in the order of about 1000 to 3000. In one form, this condensation reaction is carried out by employing a ratio of epihalohydrin to the bis-phenol at slightly below or around 2:1. Also, resinous products prepared in accordance with U.S. Patent 2,594,979 can be used.

The structure normally associated with epichlorohydrin bisphenol-A resins, used in accordance with this invention, is:

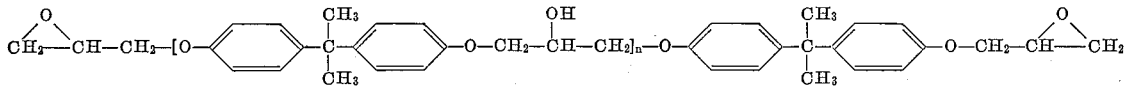

where $n$ has a value of 0 to 10 or more.

Thirteen types of EPON (a registered trademark of Shell Chemical Co.) resins are known and available for formulation into cured coatings, adhesives, castings and laminates in accordance with this invention. All of these resins possess terminal epoxide groups and are known as epoxy-type resins. The primary difference among the various types of EPON resins is molecular weight, which increases as the identifying number increases. The aliphatic epoxy resins useful herein (e.g., EPON 812) have a chemical structure of a typical molecule as follows:

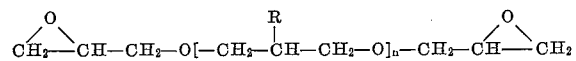

as exemplified by a glycerol-based resin (EPON 812) having a molecular weight of about 300. R in the formula is aliphatic and contains 1 to 20 carbon atoms.

All of the other members of the "EPON" series are aromatic in character, being obtained from mono and polyhydroxyaromatic compounds such as cresols, polyhydroxy naphthalenes and the like, i.e., R is aromatic or —CH$_2$— is replaced by a phenyl, naphthyl or anthryl groups in the formula for EPON 812. Other examples are Epoxide 201, a proprietary product of Union Carbide Chemicals Co., identified as 3,4-epoxy-6-methylcyclohexylmethyl-3,4-epoxy-6-methylcyclohexane carboxylate. Also the product Oxiron 2001, proprietary product of Food Machinery and Chemical Co., having an epoxy equivalent of 145 as described in copending application Serial No. 162,279, filed December 26, 1961 by T. H. Szawlowski may be used.

Table VII gives the properties of illustrative poly-epoxy monomers.

TABLE VII.—TYPICAL UNCURED EPOXY RESIN SPECIFICATIONS

| Epon Resin Type | Melting Point,[2] °C. | Color,[1] 25° C. (Gardner), max. | Viscosity,[1] 25° C. | | Epoxide Equivalent[3] |
|---|---|---|---|---|---|
| | | | Gardner-Holdt | Poises | |
| Epon 812 | Liquid | 3 | C-F | 0.9-1.5 | 140-160 |
| Epon 815 | do | 5 | | 5-7 | 175-195 |
| Epon 820 | do | 8 | | 40-100 | 180-195 |
| Epon 826 | do | 5 | | 50-100 | 175-190 |
| Epon 828 | do | 5 | | 100-160 | 180-195 |
| Epon 830 | do | 12 | | 150-225 | 190-210 |
| Epon 834 | do | 5 | O-V | 4.1-9.7 | 230-280 |
| Epon 836 | 40-45 | 5 | A$_1$-B | 0.3-0.7 | 280-350 |
| Epon 1001 | 65-75 | 4 | D-G | 1.0-1.7 | 425-550 |
| Epon 1002 | 75-85 | 4 | G-K | 1.7-3.0 | 550-700 |
| Epon 1004 | 95-105 | 4 | Q-U | 4.6-6.6 | 875-1,025 |
| Epon 1007 | 125-135 | 5 | Y-Z$_1$ | 18-28 | 2,000-2,500 |
| Epon 1009 | 145-155 | 5 | Z$_2$-Z$_5$ | 38-100 | 2,500-4,000 |

[1] Epon 812, 815, 820, 826, 828, and 830 on resin as supplied, Epon 834 on 70% wt. solution in butyl Carbitol; all other types on 40% wt. solution in butyl Carbitol at 25° C.
[2] Durrans' mercury method.
[3] Grams of resin containing one gram-equivalent of epoxide.

In one aspect of the invention polyamides are provided having enhanced curing properties by reacting a polyamine, as herein defined with a mixture of complex carboxylic acids from which the monocarboxylic acids have been removed. The exclusion of the monobasic acids to produce fractions comprising the balance of the mixed acids or fractions predominantly dicarboxylic, tricarboxylic or tetracarboxylic, as the case may be, is accomplished by means of fractionation. The detailed procedures for carrying out the fractionation of the mixed acids is described in detail in the copending applications.

Ser. No. 161,355, December 22, 1961, L. A. Joo et al.; Ser. No. 209,741, July 13, 1962, L. A. Joo; Ser. No. 209,780 (now U.S. Patent 3,180,876), July 13, 1962, L. A. Joo.

In accordance with application Ser. No. 161,355 fractions of the complex acids are separated in accordance with their acid numbers and the number of carboxyl groups per molecule by (1) dissolving the salts of the acids to be fractionated in a first solvent in which the free acids are at most only sparingly soluble; (2) adding a small amount of an acid sufficiently strong to decompose the salts and liberate a portion of the desired acids; (3) extracting the liberated acids from the resulting mixture using a second solvent which is immiscible with said first solvent; (4) adding another small amount of mineral acid to the remaining salt solution; (5) again extracting the acids thus liberated with said solvent; and (6) continuing this cyclic acidification and extraction until the first solvent is substantially free of the desired acids and their salts. The process is illustrated as follows:

*Example XIX*

A water solution containing 26 g. of the sodium salts of "extract acids" per 100 ml. was prepared, a 150 ml. portion of it was treated with 1 ml. of hydrochloric acid, and the resulting liberated acid was extracted with 20 ml. of toluene (Fraction 1, Table VIII). Then the acidification with hydrochloric acid and the extraction were repeated in cyclic fashion, until no more acid was obtained from the water phase. After the "extract acid" had reached an acid number of 220 (Fraction 6, Table VIII), the extraction solvent was changed to ether, since the higher-acid-number acids are insoluble in toluene. The results of the procedure are given in Table VIII.

TABLE VIII

Original "Extract Acid":
A.N. ------------------------------------------------ 218
Mol. Wt. --------------------------------------------- 420
Percent Unsap. --------------------------------------- 8.7
—COOH/mol. ------------------------------------------ 1.66

| Fraction No. | Amount (g.) | Acid No. | Mol. Wt. | —COOH/Mol |
|---|---|---|---|---|
| 1 | 4.84 | 77 | 424 | 0.60 |
| 2 | 5.53 | 119 | | |
| 3 | 4.81 | 122 | 400 | 0.80 |
| 4 | 4.59 | 107 | | |
| 5 | 5.46 | 163 | 400 | 1.40 |
| 6 | 2.08 | 217 | | |
| 7 | 1.62 | 298 | 400 | 2.10 |
| 8 | 0.70 | 282 | | |
| 9 | 1.33 | 342 | 390 | 2.20 |
| 10 | 1.52 | 344 | | |
| 11 | 2.18 | 389 | 385 | 2.80 |
| 12 | 0.28 | 403 | | |

*Example XX*

In this example, the same stock solution was used as in Example XIX but either was used as the extraction solvent from the beginning. First, 150-ml. portion of the "extract acid" salt solution was extracted with 20 ml. of ether. Then 5 ml. of concentrated hydrochloric acid and 10 ml. of water were added to the ether solution, and the resulting acidic water phase was separated from the ether phase, containing "free extract acid," and combined with the raffinate phase from the previous ether extraction step. After the water phases had been combined, they were extracted again with ether, the ether solution was acidified with 1 ml. of concentrated hydrochloric acid and 10 ml. of water, and the water phase was again separated from the ether phase, again containing "extract acid," and combined with the stock solution. This procedure was repeated until no more acid was obtained from the extract-acid-salt water solution when the solution was acidified.

The ether phases were washed twice with 10 ml. portions of water, and then the ether was evaporated to leave the acid fractions as products. These acid fractions had higher acid numbers than the fractions obtained by the method used in Example XIX, indicating that some acid salt had been extracted along with the acids in Example XIX. The results of this method are given in Table IX.

TABLE IX

Original "Extract Acid":
A.N. ------------------------------------------------ 218
Mol. Wt. --------------------------------------------- 420
Percent Unsap. --------------------------------------- 8.7
—COOH/mol. ------------------------------------------ 1.66

| Fraction No. | Amount (g.) | Acid No. | Mol. Wt. | —COOH/Mol |
|---|---|---|---|---|
| 1 | 0.99 | 39 | 475 | 0.33 |
| 2 | 2.72 | 104 | | |
| 3 | 3.72 | 128 | 405 | 0.92 |
| 4 | 3.96 | 143 | | |
| 5 | 3.66 | 152 | 400 | 1.10 |
| 6 | 3.07 | 157 | | |
| 7 | 3.07 | 161 | | |
| 8 | 2.81 | 175 | 400 | 1.25 |
| 9 | 2.62 | 167 | | |
| 10 | 3.09 | 195 | 440 | 1.50 |
| 11 | 2.37 | 191 | | |
| 12 | 2.89 | 247 | 415 | 1.83 |
| 13 | 2.46 | 271 | | |
| 14 | 2.47 | 285 | | |
| 15 | 2.20 | 325 | 400 | 2.30 |
| 16 | 2.12 | 408 | 430 | 3.13 |
| 17 | 0.45 | 406 | | |

Fractions 7 through 12 of Table VIII and fractions 12 through 17 of Table IX are illustrative of species of substantially dicarboxylic acids that can be used to prepare polyamide curing agents in accordance with this invention.

The desired fractions of mixed complex carboxylic acids may also be prepared in accordance with application Ser. No. 209,741 by (1) dissolving the free acid mixture to be fractionated in a first solvent in which the mixture is readily soluble; (2) adding a small amount of an aliphatic solvent to precipitate or liberate a portion of the desired acids; (3) filtering the liberated acids from the resulting mixture; (4) adding another small amount of said aliphatic solvent to the remaining acid mixture solution; (5) again filtering the acids thus liberated; and (6) continuing this cyclic precipitation and filtration until the solute consists primarily of monobasic acids and the desired di-, tri-, and tetracarboxylic acids have been separated. Illustrative examples from application Ser. No. 209,741 are given as follows:

*Example XXI*

A 40.0 g. portion of extract polybasic acids (EPA) having an acid number of 214, a molecular weight of 410, and 4.8% unsaponifiables, was dissolved in 100 ml. of toluene. To this solution, 70 ml. of n-heptane was added. The resulting precipitate was filtered, washed with pentane, and dried, and the dried precipitate was designated as fraction 1. This procedure was repeated with additional 25, 30, 35 and 40 ml. of n-heptane to yield, respectively, fractions 2, 3, 4, and 5.

Beyond this point, it was not possible to recover crystalline precipitates of high acid number. The characterization of the fractions is presented in the tabulation immediately below:

TABLE X

| Heptane Used (ml.) | Fraction No. | Amount (g.) | Acid No. | Molecular Weight | —COOH/ Molecule | Percent Unsap. |
|---|---|---|---|---|---|---|
| | Charge | 40.0 | 214 | 410 | 1.57 | 4.8 |
| 70 | 1 | 1.48 | 305 | | | |
| 25 | 2 | 1.65 | 296 | 410 | 2.16 | |
| 30 | 3 | 2.66 | 292 | | | |
| 35 | 4 | 2.00 | 285 | 420 | 2.13 | |
| 40 | 5 | 1.67 | 258 | | | |

Example XXII

An 80.0 g. portion of the same extract polybasic acid used in Example XXI was dissolved in 150 ml. of toluene, and 20 ml. aliquots of this solution were precipitated with different amounts of n-heptane. The resulting precipitates were individually filtered, washed, and dried. The solute remaining in each filtrate was recovered by distilling off the mixed toluene-heptane solvent. The fractions so derived were characterized as follows:

TABLE XI

| Fraction No. | Amount of n-Heptane Used (ml.) | Precipitate | | | | Filtrate | | | |
|---|---|---|---|---|---|---|---|---|---|
| | | g. | Acid No. | Mol. Wt. | —COOH/ Mol. | g. | Acid No. | Mol. Wt. | —COOH/ Mol. |
| (Charge) | | | 214 | 410 | 1.57 | | | | |
| 1 | 15 | 0.82 | 300 | 435 | 2.33 | 6.17 | 193 | 420 | 1.44 |
| 2 | 30 | 2.04 | 290 | | | 5.11 | 182 | | |
| 3 | 45 | 2.48 | 292 | 425 | 2.21 | 4.78 | 174 | 415 | 1.29 |
| 4 | 75 | 3.00 | 289 | | | 4.22 | 157 | | |
| 5 | 125 | 3.12 | 287 | 420 | 2.14 | 4.14 | 156 | 415 | 1.15 |
| 6 | 250 | 3.18 | 286 | | | 4.22 | 153 | | |

Example XXIII

Different concentrations of the acid mixture used in Example XIX above were prepared in toluene, and each was precipitated with a fixed amount of n-heptane. The tabulation below reports the results of these experiments.

TABLE XII

| Fraction Number | EPA/Toluene (g./ml.) | n-Heptane Added (ml.) | Acid No. of Precipitate |
|---|---|---|---|
| Charge | | | 214 |
| 1 | 2.7/10 | 250 | 286 |
| 2 | 5.3/10 | 250 | 286 |
| 3 | 8.0/10 | 250 | 287 |

Fractions 3 and 5 of Table X, precipitate fraction numbers 1, 3 and 5 of Table XI, and fractions 1, 2 and 3 of Table XII represent illustrative species of other complex acids to be used in accordance with this invention.

In accordance with said U.S. Patent 3,180,876 selected fractions of the carboxylic acids are obtained by (1) dissolving a given amount of the complex mixture of acids to be fractionated in a critical amount of a first aromatic solvent other than benzene in which the free acids are fairly soluble; (2) adding a small and preselected amount of a second aromatic solvent which causes the precipitation of high acid-number polybasic acid as the first portion of the desired acids; (3) separating the liberated acids from the resulting mixture; (4) adding another selected or small amount of the second aromatic solvent to the remaining solution; (5) again separating the acids thus liberated or precipitated; and (6) continuing this cyclic addition of incremental amounts of said second solvent and subsequent separation until the first solvent is substantially free of the desired acids. This is demonstrated by the following example.

Example XXIV

A 10.8 g. portion of extract polybasic acid, having an acid number of 218 and a molecular weight of 410, was dissolved in 22 ml. of toluene. The solution was cloudy until more than 4 g. of acid was dissolved. The final solution was clear. Then a 250 ml. portion of toluene was added to the solution, resulting in the development of cloudiness within 5 minutes and a coagulated precipitate within one-half hour. The precipitate was separated by filtration, washed with pentane, and dried, and the dried precipitate was designated as Fraction 1.

A 350 ml. portion of toluene was added to the filtrate resulting in a second precipitate which was separated, washed, dried, and designated as Fraction 2.

A 500 ml. portion of toluene was added to the filtrate, resulting in a third precipitate which was separated, washed, dried, and designated as Fraction 3.

Addition of 1000 ml. of toluene to the filtrate resulted in no more precipitation.

The tabulation below provides a summary of characterizations of the fractions produced in this experiment.

TABLE XIII

| Fraction Number | Amount (g.) | Acid No. | Molecular Weight | —COOH/ Mol | Percent Unsap. |
|---|---|---|---|---|---|
| (Charge) | 10.8 | 218 | 410 | 1.60 | 5.1 |
| 1 | 0.30 | 307 | 420 | 2.30 | |
| 2 | 0.13 | 295 | 420 | 2.21 | |
| 3 | 0.10 | 288 | 410 | 2.10 | |

Fractions 1, 2 and 3 of Table XIII are additional special fractions of dicarboxylic acids to be used in accordance with this invention.

The uncured epoxy resins are generally liquids and of limited utility. They are accordingly further polymerized or "cured" by appropriate curing agents or catalysts which react with either the terminal epoxide groups or with the secondary hydroxyl groups or both to produce cross-linking or coupling, or esterification and polymerization reaction products of increased utility.

The polyamide resins of this invention take the place of and are an improvement over the large number of known curing agents set forth in the prior art, e.g., in Table I of "Modern Plastics" Encyclopedia Issue, September 1951, pp. 108 and 109. The instant polyamide resins are used in place of the curing agents of the prior art in the various methods of curing epoxy resins, as set forth in the September 1960 issue of "Modern Plastics," Encyclopedia Issue, at pages 220 and 221. During the cure the amine terminated polyamide curing agents of this invention react with either the terminal epoxide groups or with the internal secondary hydroxyl groups, or as is generally the case, both groups react. Cross-linking or coupling is accomplished by using stoichiometric or near stoichiometric amounts of the curing agents. For low molecular weight epoxy resins the cross-linking reaction proceeds via the epoxide group. For intermediate molecular weight epoxy resins both the epoxide and hydroxyl groups react. The curing reaction involves the opening of the epoxide ring to form what is called a beta-hydroxyamino compound.

The cured epoxy compositions of this invention can be prepared using conventional techniques to prepare resins for use in coating, in electrical applications (potting compounds and insulators) and where adhesion, flexibility, toughness and chemical resistance are required. The cured epoxy compositions of this invention are highly cross-linked and exhibit low toxicity, easy handling, etc. They find use in the manufacture of home appliance finishes, drum and can linings, in highly flexible enamels, varnishes exhibiting abrasion resistance, as protective linings for tank cars and in industrial adhesives. Also, the products may be used to form castings, using metal powder as a filler, for tool and die work, and as blending agents with other resins, i.e., with furfural-ketone resins for laminating uses.

The relative amounts of the polyamide-complex carboxylic acid curing agent, the polyepoxide resin intermediate and the epoxide diluent are selected so that the concentration of the reacting polyamide carried into the final product is no greater than about 50% by weight. The extract polybasic acid will comprise about 15 to 85% and preferably 30 to 70% of the final blend. Higher and lower concentrations of the polyamide curing agent incorporated are likely to result in unsuitable polymerization reaction products or other difficulties in the useful quality of the end products. The amount of the tertiary amine or other catalyst used will vary from about 0.2 to 1.5% by weight of the total charge. The presence of the amine catalyst causes partial polymerization of the polyepoxide resin intermediate and the epoxide diluent, as well as aiding in the polymerization and/or esterification with the extract polycarboxylic acid.

One preferred aspect of the invention comprises the reaction product of an epoxy monomer and an amine terminated polyamide resin derived from the reaction of a stoichiometric excess of a polyamine having 2 to 30 carbon atoms per molecule and a complex dicarboxylic acid derived from solvent extracts obtained in the solvent refining of mineral lubricating oils, said dicarboxylic acid having the representative properties:

| Property: | Value |
|---|---|
| Avg. mol. wt. | 350–475 |
| Percent sulfur | 1.0–4.5 |
| Acid No. (1948 method) | 230–330 |
| Avg. No. of Arom. rings/means arom. mol. | 1.7–3.5 |

Such products are illustrated by the reaction product of acid fraction No. 7 of Table VIII, or acid fraction No. 15 of Table IX and a polyamine such as ethylene diamine, p-phenylene diamine, trimethylenediamine, p,p'-bis amino methyldiphenylamine, diethylenetriamine, triethylenetetramine and tetraethylenepentamine and mixtures thereof. The amine terminated polyamide resins so formed can be used to cure any of the epoxy monomers disclosed herein including particularly those shown in Table VIII.

The embodiments of this invention in which an exclusive property or privilege is claimed are defined as follows:

1. A polymerized epoxy resin composition consisting essentially of the sequential reaction product of
   (1) complex polynuclear aromatic carboxylic acids obtained by metalation of solvent extracts obtained in the solvent extraction of mineral lubricating oils using a solvent selective for aromatic compounds, to form the alkali metal adduct, carbonation of said adduct to form the corresponding alkali metal salts of the carboxylic acids, and acidification of said salts to form a mixture of free carboxylic acids containing 1 to 7 carboxyl groups per molecule,
   (2) a curable epoxy monomer having at least 1 terminal epoxide group and
   (3) a linear polyamide prepared by the condensation of said mixture of acids defined in (1) and a polyfunctional amine having at least one hydrogen atom on each amino nitrogen and containing 2 to 70 carbon atoms wherein said complex acid and said linear polyamide comprise about 15% to about 85% by wt. based on the final product.

2. A polymerized epoxy resin in accordance with claim 1 in which said curable epoxy monomer is epichlorohydrin.

3. A polymerized epoxy resin composition consisting essentially of the sequential reaction product of
   (1) a curable epoxy monomer of the group consisting of polymerized ethylene oxide, epichlorohydrin, butadiene diepoxide, divinylbenzene diepoxide, diglycidyl ether, the condensation products of: epichlorohydrin-bis-(4-hydroxyphenyl) dimethylmethane, epichlorohydrin-resorcinol, epichlorohydrin-hydroquinone, epichlorohydrin-pyrocatechol, epichlorohydrin-saligenin, epichlorohydrin-phloroglucinol, epichlorohydrin - trihydroxydiphenoldimethylmethane, epichlorohydrin-fluor - 4 - dihydroxybiphenol, epichlorohydrin-4,4'-dihydroxydiphenol sulfone, epichlorohydrin-ethylene glycol, epichlorohydrin-glycerol, epichlorohydrin - erythritol, epichlorohydrin-pentaerythritol, diglycidyl ester of succinic acid, diglycidyl ester of suberic acid, diglycidyl ester of pimelic acid and diepoxy esters of 4,4-tetrahydrodipyridyl dicarbamic acid,
   (2) complex polynuclear aromatic carboxylic acids obtained by metalation of solvent extracts obtained in the solvent extraction of mineral lubricating oils, using a solvent selective for aromatic compounds, to form the alkali metal adduct, carbonation of said adduct to form the corresponding alkali metal salt of the carboxylic acid and acidification of said salt to form the free carboxylic acids and
   (3) a linear polyamide prepared by the condensation of said mixture of acids defined in (1) and a polyfunctional amine having at least one hydrogen atom on each amino nitrogen and containing 2 to 70 carbon atoms wherein said complex acid and said linear polyamide comprise about 15% to about 85% by wt. based on the final product.

References Cited by the Examiner

UNITED STATES PATENTS 2,951,004  8/1960  Martin et al. _____ 260—830
3,154,524  10/1964  Martinek _____ 260—78

OTHER REFERENCES

Peerman et al.: Reaction of Polyamide Resins and Epoxy Resins, in Industrial and Engineering Chemistry, July 1957 (pp. 1091–1094) (260–830) (Copy in Scientific Library).

MURRAY TILLMAN, *Primary Examiner.*

E. J. TROJNAR, P. LIEBERMAN, *Assistant Examiners.*